United States Patent
Lavanchy et al.

(10) Patent No.: US 12,016,399 B2
(45) Date of Patent: Jun. 25, 2024

(54) AEROSOL-GENERATING DEVICE WITH MOUTHPIECE DETECTION

(71) Applicant: PHILIP MORRIS PRODUCTS S.A., Neuchatel (CH)

(72) Inventors: Frederic Lavanchy, Chavornay (CH); Oleg Mironov, Cudrefin (CH); Johannes Petrus Maria Pijnenburg, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 470 days.

(21) Appl. No.: 17/414,085

(22) PCT Filed: Dec. 13, 2019

(86) PCT No.: PCT/EP2019/085084
§ 371 (c)(1),
(2) Date: Jun. 15, 2021

(87) PCT Pub. No.: WO2020/126908
PCT Pub. Date: Jun. 25, 2020

(65) Prior Publication Data
US 2022/0039478 A1    Feb. 10, 2022

(30) Foreign Application Priority Data
Dec. 17, 2018 (EP) .................... 18212966

(51) Int. Cl.
*A24F 40/53* (2020.01)
*A24F 7/00* (2006.01)
(Continued)

(52) U.S. Cl.
CPC ............. *A24F 40/53* (2020.01); *A24F 7/00* (2013.01); *A24F 40/20* (2020.01); *A24F 40/57* (2020.01);
(Continued)

(58) Field of Classification Search
CPC .......... A24F 40/53; A24F 40/20; A24F 40/57; A24F 7/00; G06K 7/10366; G06K 7/1413
(Continued)

(56) References Cited

U.S. PATENT DOCUMENTS 9,668,521 B2 * 6/2017 Kuczaj .................... A24F 40/57
9,826,780 B2   11/2017 Krietzman
(Continued)

FOREIGN PATENT DOCUMENTS

EP    2 959 786     12/2015
JP    2015-524260    8/2015
(Continued)

OTHER PUBLICATIONS

PCT Search Report and Written Opinion for PCT/EP2019/085084 dated Feb. 13, 2020 (17 pages).
(Continued)

*Primary Examiner* — Abdullah A Riyami
*Assistant Examiner* — Vladimir Imas
(74) *Attorney, Agent, or Firm* — Mueting Raasch Group (57) ABSTRACT

The invention relates to an aerosol-generating device (10) for receiving a mouthpiece (12). The aerosol-generating device comprises a detection element (20) for detecting a type of mouthpiece received by the aerosol-generating device, a controller (24) for controlling an operation parameter of the aerosol-generating device and a heating element configured to heat an aerosol-forming substrate of an aerosol-generating article (28) when the aerosol-generating article is received by the aerosol-generating device. The controller is configured to receive an input indicative of the type of mouthpiece detected by the detection element and configured to control the operation parameter of the aerosol-generating device on basis of the detected type of mouthpiece received by the aerosol-generating device. The opera-
(Continued)

tion parameter of the aerosol-generating device comprises a temperature profile of the heating element during heating.

14 Claims, 5 Drawing Sheets

(51) Int. Cl.
*A24F 40/20* (2020.01)
*A24F 40/57* (2020.01)
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
USPC ........................................................ 131/328
See application file for complete search history.

(56) References Cited

U.S. PATENT DOCUMENTS

| | | | | |
|---|---|---|---|---|
| 9,949,507 | B2* | 4/2018 | Flick | A24F 40/50 |
| 10,959,459 | B2* | 3/2021 | Sur | A24F 40/65 |
| 11,033,054 | B2* | 6/2021 | Lamb | H04B 5/77 |
| 11,160,939 | B2* | 11/2021 | Sears | A61M 15/06 |
| 11,234,463 | B2* | 2/2022 | DePiano | F22B 1/282 |
| 2014/0321837 | A1 | 10/2014 | Flick | |
| 2015/0128968 | A1* | 5/2015 | Chapman | A24F 7/00 131/329 |
| 2017/0020191 | A1* | 1/2017 | Lamb | A24F 40/53 |
| 2018/0338542 | A1* | 11/2018 | Rogan | H05B 3/0014 |
| 2021/0282465 | A1* | 9/2021 | Cristian | A24F 40/53 |
| 2022/0095692 | A1* | 3/2022 | Ferrie | A24F 40/57 |

FOREIGN PATENT DOCUMENTS

| | | |
|---|---|---|
| JP | 2018-015004 | 2/2018 |
| KR | 10-2018-0124740 | 11/2018 |
| WO | WO 2014/102091 | 7/2014 |
| WO | WO 2018/050701 | 3/2018 |

OTHER PUBLICATIONS

International Preliminary Report on Patentability for PCT/EP2019/085084 dated Mar. 22, 2021 (8 pages).
Office Action issued in Korea for Application No. 10-2021-7016282 dated Aug. 1, 2023 (15 pages. English translation included.
Office Action issued in China for Application No. 201980071001.6 dated Nov. 22, 2023 (7 pages). English translation included.

* cited by examiner

AEROSOL-GENERATING DEVICE WITH MOUTHPIECE DETECTION

This application is a U.S. National Stage Application of International Application No. PCT/EP2019/085084 filed Dec. 13, 2019, which was published in English on Jun. 25, 2020, as International Publication No. WO 2020/126908 A1. International Application No. PCT/EP2019/085084 claims priority to European Application No. 18212966.8 filed Dec. 17, 2018.

The present invention relates to an aerosol-generating device, to a mouthpiece for an aerosol-generating device, to a set of mouthpieces for an aerosol-generating device, to a system, to a method and to a non-transitory computer readable medium comprising software.

It is known to provide aerosol-generating devices, in which an aerosol-generating article containing aerosol-forming substrate can be inserted. The aerosol-forming substrate is heated by a heating element arranged in or around a heating chamber of the aerosol-generating device. The aerosol-forming substrate is vaporized to form an aerosol, by heating the aerosol-forming substrate. The generated aerosol may then be drawn towards a mouthpiece for inhalation by a user.

The aerosol generation depends upon multiple factors. One important factor is the conditions in which the device is operated. In dry or hot conditions, preheating of the substrate may not be necessary or at least the preheating time can be short. Contrary, in cold or humid conditions, preheating may be mandatory for a pleasant user experience.

Different users may have differing preferences for one or more properties of the generated aerosol. For example, some users may prefer more visible exhaled aerosol, whilst other users may prefer a more discreet amount of visible exhaled aerosol. Some users may prefer a stronger taste compared to other users.

It would be desirable to provide an aerosol-generating device which would optimally generate inhalable aerosol in different conditions. It would also be desirable to provide an aerosol-generating device able to provide a variety of types of experiences to a user. It would also be desirable to provide an aerosol-generating device which would enable a user to customise a type of experience. It would also be desirable to provide an aerosol-generating device which would enable modification of an operating parameter of the aerosol-generating device to customize the smoking experience.

According to a first aspect of the invention there is provided an aerosol-generating device for receiving a mouthpiece. The device comprises a controller for controlling an operation parameter of the aerosol-generating device. The controller may be configured to receive an input indicative of the type of mouthpiece received by the device. The device may comprise a detection element for detecting a type of mouthpiece received by the aerosol-generating device. The input may be a signal from the detection element indicative of the type of mouthpiece detected by the detection element. The controller is further configured to control the operation parameter of the aerosol-generating device on basis of the detected type of mouthpiece received by the aerosol-generating device.

The usage of multiple mouthpieces enables customization of the smoking experience. The different mouthpieces could be adapted to be used in different conditions such as in dry or hot conditions or in humid or cold conditions. The mouthpiece which is used in certain conditions enables an optimized smoking experience, since a user may choose to attach a suitable mouthpiece to the aerosol-generating device for the given conditions.

In addition or alternatively, the different mouthpieces enable customization of the smoking experience independent of the climate conditions. For example, a user may want to wish to maximize aerosol generation to experience a dense aerosol. A mouthpiece may in this case be utilized by the user which is optimized for generation of dense aerosol. If a user prefers to stay discrete, another mouthpiece design could be used reducing the aerosol formation and therefore making it less visible. One mouthpiece design may enable a user to have a strong smoking experience, for example by increasing nicotine delivery, while a further mouthpiece design may allow for a light smoking experience, for example by decreasing nicotine delivery. Additionally or alternatively, a user may use different types of aerosol-generating articles. For optimal operation, different operation parameters may be chosen for different aerosol-generating articles. These different operation parameters may be controlled by the user by using different types of mouthpieces.

The aerosol-generating device is configured to realize a different operation parameter on basis of the type of mouthpiece received by the aerosol-generating device. Hence, the device may implement different operation parameters for dealing with different climate conditions or due to individual preferences of a user by using the appropriate mouthpiece together with the aerosol-generating device. A single aerosol-generating device can therefore be used with different purposes and with optimized functionality for different conditions and user preferences with the usage of multiple mouthpieces of different types.

The mouthpieces may be attached to the aerosol-generating device by attachment means. The attachment means may be any conventional attachment means such as a threat connection or magnets. The aerosol-generating device and the mouthpieces may comprise corresponding attachment means. Attachment means such as a snap-fit connection could also be employed.

As used herein, the terms 'upstream', 'downstream', 'proximal' and 'distal' are used to describe the relative positions of components, or portions of components, of the aerosol-generating device and the mouthpieces in relation to the direction in which a user draws during use thereof. The mouthpiece may be attached to a proximal end of the aerosol-generating device, which means to a downstream end of the aerosol-generating device. This end of the aerosol-generating device faces a user during use of the aerosol-generating device. When a mouthpiece is received by the aerosol-generating device, generated aerosol can be drawn into the mouth of a user through the mouthpiece. If attachment means are provided, these may be arranged such that an airflow channel provided in the mouthpiece is not blocked by the attachment means, so that the air can freely flow through the airflow channel in the mouthpiece towards a user's mouth.

The detection element is configured to detect a type of mouthpiece received by the aerosol-generating device. The detection element may be any known element from the art. The detection element may be arranged at or adjacent the proximal end of the aerosol-generating device for detecting the presence and type of a mouthpiece received by, attached to, or otherwise engaged with the proximal end of the aerosol-generating device. The mouthpiece may comprise one or more identification elements. The one or more identification elements may be detectable by the detection element.

The controller may be part of electric circuitry, which may comprise a microprocessor. The microprocessor may be a programmable microprocessor. The electric circuitry may comprise further electronic components. The electric circuitry may be configured to regulate a supply of power to a heating element of the aerosol-generating device. Power may be supplied to the heating element continuously following activation of the system or may be supplied intermittently, such as on a puff-by-puff basis. However, the controller may be configured to only allow supply of power to the heating element when the detection element has detected that a mouthpiece is received by, attached to, or otherwise engaged with the aerosol-generating device. The power may be supplied to the heating element in the form of pulses of electrical current. The controller may be configured to output a signal to one or more elements of the aerosol-generating device based on the detected type of mouthpiece received by the aerosol-generating device. The controller may be configured to output a signal to the heating element of the aerosol-generating device based on the detected type of mouthpiece received by the aerosol-generating device.

The aerosol-generating device may comprise a power supply, typically a battery, within a main body of the aerosol-generating device. As an alternative, the power supply may be another form of charge storage device such as a capacitor. The power supply may require recharging and may have a capacity that allows for the storage of enough energy for one or more smoking experiences; for example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the heater. The power supply may be a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

In all of the aspects of the disclosure, the heating element of the aerosol-generating device may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium- titanium- zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

In one or more embodiments, the heating element of the aerosol-generating system may be a susceptor element of an induction heating arrangement. The induction heating arrangement may comprise an induction coil and the susceptor element. The susceptor element may be provided as part of the aerosol-generating device, as part of the aerosol-generating article, or as both part of the aerosol-generating device and as part of the aerosol-generating article. Induction heating arrangements offer advantages and have been proposed in aerosol-generating systems. Induction heating arrangements are for example described in at least WO95/27411 A1.

In general, a susceptor is a material that is capable of absorbing electromagnetic energy and converting it to heat. When located in an alternating electromagnetic field, typically eddy currents are induced and hysteresis losses occur in the susceptor causing heating of the susceptor. Changing electromagnetic fields generated by one or several inductors, for example, induction coils of an inductive heating device heat the susceptor, which then transfers the heat to the surrounding aerosol-forming substrate, such that an aerosol is formed. The heat transfer may be mainly by conduction of heat. Such a transfer of heat is best, if the susceptor is in close thermal contact with tobacco material and aerosol former of the aerosol-forming substrate.

The susceptor may be formed from any material that can be inductively heated to a temperature sufficient to generate an aerosol from the aerosol-forming substrate. A preferred susceptor may comprise or consist of a ferromagnetic material, for example a ferromagnetic alloy, ferritic iron, or a ferromagnetic steel or stainless steel. A suitable susceptor may be, or comprise, aluminium. Preferred susceptors may be heated to a temperature in excess of 250 degrees Celsius.

Preferred susceptors are metal susceptors, for example stainless steel. However, susceptor materials may also comprise or be made of graphite, molybdenum, silicon carbide, aluminum, niobium, Inconel alloys (austenite nickel-chromium-based superalloys), metallized films, ceramics such as for example zirconia, transition metals such as for example iron, cobalt, nickel, or metalloids components such as for example boron, carbon, silicon, phosphorus, aluminium.

Preferably, the susceptor material is a metallic susceptor material.

The susceptor may also be a multi-material susceptor and may comprise a first susceptor material and a second susceptor material. In some embodiments, the first susceptor material may be disposed in intimate physical contact with the second susceptor material. The second susceptor material preferably has a Curie temperature that is below the ignition point of the aerosol-forming substrate. The first susceptor material is preferably used primarily to heat the susceptor when the susceptor is placed in a fluctuating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Suitable materials for the second susceptor material may include nickel and certain nickel alloys.

By providing a susceptor having at least a first and a second susceptor material, the heating of the aerosol-forming substrate and the temperature control of the heating may be separated. Preferably the second susceptor material is a magnetic material having a second Curie temperature that is substantially the same as a desired maximum heating temperature. That is, it is preferable that the second Curie temperature is approximately the same as the temperature that the susceptor should be heated to in order to generate an aerosol from the aerosol-forming substrate.

As described, in any of the aspects of the disclosure, the heating element may be part of an aerosol-generating device. The aerosol-generating device may comprise an internal heating element or an external heating element, or both internal and external heating elements, where "internal" and "external" refer to the aerosol-forming substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that run through the center of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of a heating chamber of the aerosol-generating device. Alternatively, an external heating element may take the form of a metallic grid or grids, a flexible printed circuit board, a molded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element advantageously heats the aerosol-forming substrate by means of conduction. The heating element may be at least partially in contact with the substrate, or the carrier on which the substrate is deposited. Alternatively, the heat from either an internal or external heating element may be conducted to the substrate by means of a heat conductive element.

Instead of a heating element, an atomizer may be provided to atomize liquid aerosol-forming substrate to form an aerosol, which can subsequently be inhaled by a user. The atomizer may comprise a heating element, in which case the atomizer will be denoted as a vaporiser. Generally, the atomizer may be configured as any device which is able to atomize the liquid aerosol-forming substrate. For example, the atomizer may comprise a nebulizer or an atomizer nozzle based on the Venturi effect to atomize the liquid aerosol-forming substrate. Thus, the atomization of the liquid aerosol-forming substrate may be realized by a non-thermally aerosolization technique. A mechanically vibrating vaporiser with vibrating elements, vibrating meshes, a piezo-driven nebulizer or surface acoustic wave aerosolization may be used.

As used herein, the term 'aerosol-generating article' refers to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. A smoking article comprising an aerosol-forming substrate comprising tobacco is referred to as a tobacco stick.

The aerosol-generating article may be substantially cylindrical in shape. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between approximately 30 mm and approximately 100 mm. The aerosol-generating article may have an external diameter between approximately 5 mm and approximately 12 mm. The aerosol-generating article may comprise a filter plug. The filter plug may be located at a downstream end of the aerosol-generating article. The filter plug may be a cellulose acetate filter plug. The filter plug may be a hollow acetate tube. The filter plug is approximately 7 mm in length in one embodiment, but may have a length of between approximately 5 mm to approximately 10 mm. If a hollow acetate tube is used, the hollow acetate tube may have a length between 10 mm to 25 mm. The aerosol-generating article may comprise a substrate section, which preferably directly abuts the filter plug or hollow acetate tube. In one embodiment, the aerosol-generating article has a total length of approximately 45 mm.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

In a particularly preferred embodiment, the aerosol-forming substrate comprises a gathered crimpled sheet of homogenised tobacco material. As used herein, the term ‘crimped sheet’ denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

During use, in some embodiments, the aerosol-generating article may be enclosed by the aerosol-generating device. The mouthpiece may be received by, attached to, or otherwise engaged with the aerosol-generating device. The heating chamber of the aerosol-generating device may be arranged near the proximal end of the aerosol-generating device. The aerosol-generating article may be partly or fully inserted into the heating chamber of the aerosol-generating article during use. When a mouthpiece is attached to the device, the aerosol-generating article may be partly received in the mouthpiece. During use, a user may draw on the mouthpiece and not directly on the aerosol-generating article. The mouthpiece may be directly attached to the aerosol-generating device. Alternatively, an intermediate element may be disposed between the aerosol-generating device and the mouthpiece. The intermediate element may be part of the mouthpiece, in which case the mouthpiece would be a two-piece element. The intermediate element may be used for controlling the operation mode of the aerosol-generating device as described above. This has the advantage that it may not be necessary to provide multiple mouthpieces for the different operation modes of the aerosol-generating device, but that only multiple intermediate elements may be necessary. Hence, the intermediate elements may comprise one or more identification elements enabling the detection element of the aerosol-generating device the identification of a type of intermediate element.

The term ‘operation parameter’ denotes a parameter influencing the way aerosol is generated during use of the aerosol-generating device. It will be appreciated that ‘the way aerosol is generated’ may refer to any one or more properties of the aerosol, or of the user experience, or both. For example, this may include a duration of a user experience. In some embodiments, the operating parameter may comprise one or more of: a maximum operating temperature for the heating element, the temperature of the heating element over time, the resistance of the heating element, the resistance of the heating element over time, the power supplied to the heating element, the power supplied to the heating element over time, a maximum heating time per puff, a minimum time between puffs, a maximum number of puffs per aerosol-generating article, a rate of air flow through the device and a maximum total heating time for the aerosol-generating article. In some embodiments, the operating parameter may comprise a duration of time for preheating the heating element. The operation parameter may comprise one of more of the above parameters for a preheating period of the heating element. Establishing an operating parameter tailored to the particular conditions or user preferences may be advantageous because the aerosol-forming substrates in particular aerosol-generating articles may require or provide an improved smoking experience with particular heating conditions. Alternatively or additionally to controlling a single operation parameter, the controller may be configured to control multiple operation parameters. The controller may be configured to control multiple operation parameters over time. The controller may be configured to control an operation regime of the aerosol-generating device. An operation regime may comprise multiple operation parameters over time. In some embodiments, 'operation parameter' may refer to a temperature profile of the heating element. The term 'temperature profile' may refer to any one or combination of more than one of the above operation parameters. For example, 'temperature profile' may refer to any of: a temperature of the heating element over time, a temperature gradient of the heating element over time, a power applied to the heating element over time, a resistance of the heating element over time, a maximum heating time per puff and a maximum total heating time per aerosol-generating article.

In some embodiments, the operational parameter may comprise a 'power boost mode'. A 'power boost mode' may refer to a mode in which additional electrical energy is supplied to the heating element. In this mode, the controller may be configured to control the supply from the power source to the heating element so that more electrical energy is supplied to the heating element. Alternatively or additionally, the aerosol-generating device may comprise one or more additional power sources. An additional power source may have a similar configuration as the main power source described above. An additional power source may be a battery. The controller may be configured to control of the flow of electrical energy from the one or more additional power sources to the heating element. Preferably, the controller is configured to control the flow of electrical power from the main power supply as described above and from one or more additional power sources to the heating element. Electrical power from the main power supply and from one or more additional power sources may be supplied to the heating element via common electrical contacts.

A 'power boost mode' may be utilized to rapidly heat the heating element to a desired temperature, for example during a puff of a user. A 'power boost mode' may be utilized to heat aerosol-forming substrate which requires additional heat.

A 'power boost mode' may be employed based upon the detected type of mouthpiece. Depending upon the detected type of mouthpiece, a 'power boost mode' may be activated at the beginning or at any time of an operation of the device. Additionally or alternatively, a 'power boost mode' may be inhibited at any time of an operation of the device. The type of mouthpiece may determine when during operation of the device a 'power boost mode' may be used.

A 'power boost mode' may advantageously be employed if the aerosol-generating device may be configured to receive multiple aerosol-generating articles. In this regard, in some embodiments, the aerosol-generating device may be configured to receive multiple aerosol-generating articles. The aerosol-generating articles may be of the same type or of a different type, for example may comprise different aerosol-forming substrates. The aerosol-generating device may comprise one or more of: multiple heating chambers, multiple heating elements, multiple controller and multiple power sources for facilitating operation with multiple aerosol-generating articles. If more than one aerosol-generating article is received in the aerosol-generating device and if it is desired to heat the aerosol-forming substrates in the aerosol-generating articles, a 'power boost mode' may be utilized. The 'power boost mode' may be used in that additional electrical energy may be supplied to the multiple aerosol-generating articles. Preferably, at least one additional power supply is used for this purpose. Exemplarily, the main power supply may be utilized to supply power to a first aerosol-generating article received in the aerosol-generating device and an additional power supply may be utilized to supply power to a second aerosol-generating article received in the aerosol-generating device. A 'power boost mode' may be used to supply additional electrical energy to a single heating element or to supply electrical energy to multiple heating elements or to supply electrical energy to multiple heating elements and additional electrical energy to each of the multiple heating elements.

In embodiments employing induction heating arrangements, the term 'operation parameter' may also denote one or more parameters relating specifically to induction heating. Induction heating arrangements typically comprise an induction coil and a susceptor, which functions as a heating element. Accordingly, an operation parameter controlled in dependence of the detected mouthpiece type may, in some embodiments, be one or more parameters of an induction coil such as any one of or any combination of two or more of: coil frequency, applied electric voltage, applied electric current and applied power.

In some embodiments, the term 'operation parameter' may also denote one or more parameters relating to user interface properties, such as optical, acoustic, haptic or other sensorial properties of the aerosol-generating device. For example, the aerosol-generating device may comprise optical elements such as LEDs which may be controlled to produce a specific light pattern depending on the type of mouthpiece detected by the aerosol-generating device. The aerosol-generating device may also comprise vibrational elements that may produce a specific haptic pattern depending on the type of mouthpiece detected by the aerosol-generating device.

The controllable user interface property may be preprogrammed or may be programmable by the user. Programming of the device may be performed via an application via an external computer or a personal computer device such as a tablet or a mobile phone. By allowing the user to choose a desired user interface property from a plurality of options, each user may individually design the behaviour of their aerosol-generating device.

The detection element may comprise one or more of an optical recognition element, a barcode reader, a RFID reader, a poka yoke, a conductor, a resistor or an inductor. The different types of mouthpieces to be detected by the detection element may comprise corresponding identification elements.

In some embodiments, the identification element may comprise one or more of a barcode, a pattern, a RFID tag, a poka yoke, a taggant, a conductive patch or conductor, a resistivity value, a resistor, an area with differing resistance relative to the rest of the mouthpiece, a capacitor, a capacitance, a susceptor material or an inductive element.

The term 'type' of a mouthpiece may refer to one or more properties, features or characteristics of the mouthpiece. One or more properties may include an identification element such as a barcode, a RFID tag, a poka yoke, a taggant, a conductor, a resistor or an induction element of a mouthpiece. One or more properties may include a pattern, a structure, a texture or a material of a mouthpiece.

The detection element may be any of: a mechanical device, an optical device, an opto-mechanical device and a micro electro mechanical systems (MEMS) based sensor. The optical recognition element of the detection element may comprise at least one light emitter and at least one light sensor. The detection element may comprise more than one light sensor in the form of a one dimensional (e.g., linear) array of light sensors. The detection element may comprise more than one light sensor in the form of a two dimensional array of light sensors. The detection element may comprise multiple light emitters.

The identification elements of the mouthpieces may each comprise a taggant, which may comprise an identifiable spectroscopic signature. The taggant may be incorporated within a material of the mouthpiece. This identifiable spectroscopic signature may be used in conjunction with the detection element of the aerosol-generating device comprising at least one light emitter and at least one light sensor. The taggant may comprise an identifiable spectroscopic signature in absorption. When the taggant is illuminated by the light emitter of the detection element, the taggant may absorb a specific wavelength, or set of wavelengths, and the wavelengths of light subsequently received by the light sensor may enable the detection element of the aerosol-generating device to determine the taggant and thus the type of received mouthpiece in dependence of the absent wavelengths. The physical and chemical structure of the taggant may be controlled such that the absorbed wavelength of light may be set as required. The absorbed wavelength of light may not be in the visible spectrum. Preferably, the absorbed wavelength is in the Infra-red or Ultraviolet range.

The taggant may comprise an identifiable spectroscopic signature in emission. When the taggant is illuminated by the light emitter of the detection element of the aerosol-generating device, the light preferably excites the taggant so that the taggant emits at least one wavelength of light, shifted from the wavelength of the excitation light. As will be appreciated, this is a form of photoluminescence, and may be phosphorescence, or fluorescence. By controlling the physical and chemical structure of the taggant, the spectroscopic signature may be controlled. In some embodiments, the identifiable signature may be in dependence on the time response of the emission in relation to the excitation, or the decay rate of the emission after excitation. The wavelength of the emitted light may not be in the visible spectrum. Preferably, the wavelength of the emitted light is in the Infra-red or Ultraviolet range. The emitted light may be detected by the light sensor of the detection element for detecting the type of received mouthpiece. The detection element may determine the type of mouthpiece by comparing the spectroscopic signature of the detected taggant with a look-up table of taggant spectroscopic signatures corresponding to different mouthpiece types.

The taggant may be a powder composed of at least one of: a rare earth; an actinide metal oxide; a ceramic. The rare earth is preferably a lanthanide.

The identification elements of the mouthpieces may each comprise black markings. The identification elements may each include different grey levels. Different grey levels may be generated by varying the dose of ink or by printing in dots that are smaller than the minimum feature size resolvable by the detection element. The identification elements may comprise a one dimension barcode. Each line in the barcode may extend around a part of the mouthpiece so that the mouthpiece may be received by, preferably attached to, the aerosol-generating device in any orientation. Alternatively, a two dimensional barcode may be used. The identification element of the mouthpiece may additionally or alternatively comprise a QR code, NFC tag, or RFID tag. The detection element may comprise corresponding sensors.

The identification elements of the different types of mouthpieces may each comprise a RFID tag. The RFID tags may advantageously be passive, requiring no battery power to be used. A RFID tag may be interrogated by a powered RFID reader as known in the art. The detection element of the aerosol-generating device may comprise a RFID reader. The RFID reader may sweep the RFID tag to determine the resonance frequency of the tag, which may correlate to the type of mouthpiece. The RFID reader may be configured to interrogate the RFID tag at one or more discrete frequencies. The detection element of the aerosol-generating device may include any suitable number of RFID readers to obtain signals from one or more RFID tags. One RFID reader may interrogate and read more than one RFID tags.

The detection element of the aerosol-generating device may include one or more conductors, preferably pairs of conductors, defining at least a portion of one or more circuits. The conductors may be selectively electrically coupleable with one or more conductors of the identification elements of the mouthpieces, when a mouthpiece is received by the aerosol-generating device. Attachment of a mouthpiece to the aerosol-generating device may close one or more of the circuits. The one or more circuits may be indicative of the type of received mouthpiece.

The identification elements of the mouthpieces may each include one or more resistors. Upon a mouthpiece being received by the aerosol-generating device, the electrical resistance of the resistors may be determined by the detection element of the aerosol-generating device. The resistor may also be an area of differing resistance relative to the rest of the mouthpiece. This information may be used to determine the resistance of the resistors, and therefore, identify the type of received mouthpiece.

The identification elements of the mouthpieces may each comprise a microchip with a wireless transceiver, which communicates identification information to the detection element of the aerosol-generating device.

The detection element may comprise an inductor. In this case, the identification elements of the mouthpieces may each comprise a corresponding induction element such as susceptor material. A probing induction current may be utilized in this aspect by the detection element to identify the type of received mouthpiece.

The aerosol-generating device may comprise a heating chamber for receiving an aerosol-generating article containing aerosol-forming substrate. The aerosol-generating device may comprise a heating element configured to heat an aerosol-forming substrate of an aerosol-generating article when the aerosol-generating article is received by the aerosol-generating device, preferably inserted into the heating chamber. The operation parameter of the aerosol-generating device may comprise the temperature profile of the heating element during heating.

Said controlling of the operation parameter of the aerosol-generating device may comprise selecting one or more properties of the temperature profile on the basis of the detected type of received mouthpiece. Said at least one or more properties may comprise any of: a duration of time of a preheating period; a target temperature for a preheating period; a temperature change over time during a preheating period; a temperature change over time during a usage session of the aerosol-generating device; one or more target temperatures during a usage session; and a duration of time of a usage session.

At least a first and a second temperature profile may be stored in a memory means. In some embodiment, the aerosol-generating device comprises the memory means. In some embodiments, the aerosol-generating device comprises means for accessing a memory on a remote device. In some embodiments, the remote device may be a server, a computer, a personal computer device such as a tablet or a mobile phone. In some embodiments the means for accessing a memory on the remote device may comprise wireless communication means such as Bluetooth® or other wireless communication protocols. Controlling an operation parameter may comprise selecting a predefined temperature profile from a memory device, on the basis of the type of mouthpiece received by the aerosol-generating device. In some embodiments, controlling an operation parameter may comprise selecting a predefined temperature profile from a database or look up table stored in the memory, on the basis of the detected type of mouthpiece received by the aerosol-generating device. The first temperature profile may comprise a shorter preheating period then the second temperature profile. The length of the preheating period of the first temperature profile may have a length of maximal 70%, preferably 50%, more preferably 30% of the length of the preheating period of the second temperature profile. The memory may be connected with the controller. The controller may be configured to operate the heating element on basis of the detected received mouthpiece and the operation parameter, such as one or more temperature profiles stored in the memory.

A preheating period may be necessary or advisable for aerosol generation. In this regard, preheating may reduce the response time once the user desires to generate the aerosol. Whether preheating is advisable or not may depend upon the climate conditions such as temperature or humidity. A specific mouthpiece may be received by the aerosol-generating device, wherein this mouthpiece may correspond to a first temperature profile. Hence, if the detection element of the aerosol-generating device detects this mouthpiece, the controller of the aerosol-generating device will control the heating of the heating element of the aerosol-generating device according to the first temperature profile. The first temperature profile with a shorter preheating period may be used in dry or hot climates. A second mouthpiece may be used for a second temperature profile. After detection of the mouthpiece received by the aerosol-generating device by the detection element, the controller may utilize a second temperature profile for heating of the heating element of the aerosol-generating device. This second temperature profile may be used in humid or cold conditions to optimize aerosol generation.

At least a third and a fourth temperature profile may be stored in a memory. Controlling an operation parameter may comprise selecting a predefined temperature profile from a look up table stored in the memory, on the basis of the detected type of mouthpiece received by the aerosol-generating device. The third temperature profile may be configured to transfer less heating energy to an aerosol-generating article inserted into the heating chamber than the fourth temperature profile. The transmitted heating energy of the third temperature profile may be maximal 70%, preferably 50%, more preferably 30% of the transmitted heating energy of the fourth temperature profile.

The term 'heating energy' may denote the total energy emitted from the heating element during one puff of a user. The heating energy may a function depending upon the temperature of the heating element over the time of a puff. The heating energy may be varied depending upon the smoking experience the user desires. The user may use different mouthpieces for these different smoking experiences. For a lighter smoking experience, in which one puff contains one or more of less aerosol, less dense aerosol or less nicotine, a user may attach a mouthpiece to the aerosol-generating device corresponding to the third temperature profile. During subsequent aerosol generation of the aerosol-generating device, less aerosol or less dense aerosol or aerosol containing less nicotine will be generated due to the heating energy being lower. If a user desires a richer smoking experience, the user may attach a different mouthpiece to the aerosol-generating device corresponding to the fourth temperature profile. More heating energy may be emitted by the heating element in this temperature profile to create one or more of more aerosol, denser aerosol or aerosol containing more nicotine.

The invention also relates to a non-transitory computer readable medium comprising software for causing the controller of the aerosol-generating device as described above to execute said controlling the operation parameter on the basis of the detected type of mouthpiece received by the aerosol-generating device.

The invention also relates to a mouthpiece for an aerosol-generating device as described above. The mouthpiece may be configured to be received by the aerosol-generating device. The mouthpiece may comprise an identification element indicative of the type of mouthpiece. The identification element is detectable by the aerosol-generating device, when the mouthpiece is received by the aerosol-generating device. The mouthpiece may comprise a tag configured to enable a user identification of the type of mouthpiece. The tag of the mouthpiece may be one or more of a visual indicator, such as a colour of the mouthpiece, a logo, symbol, picture, pattern and haptic structure on at least a part of the mouthpiece, a texture of the mouthpiece, and a packaging provided with the mouthpiece.

The mouthpiece may comprise attachment means corresponding to the attachment means of the aerosol-generating device. For example, the mouthpiece may comprise male threads, while the aerosol-generating device may comprise female threads or vice versa. Attachment means such as magnetic or snap-fit connections may be utilized.

The identification element of the mouthpiece may correspond to the detection element of the aerosol-generating device, such that the detection element of the aerosol-generating device can identify the type of mouthpiece received by the aerosol-generating device. Hence, the identification element may be a corresponding element to one or more of an optical recognition element, a barcode reader, a RFID reader, a poka yoke, a taggant, a conductor, a resistor or an inductor.

The invention also relates to a mouthpiece or to a set of mouthpieces, which may comprise at least a first and a second mouthpiece. Each mouthpiece may comprise an airflow channel. The mouthpieces may be configured to cool air flowing through the airflow channels. The airflow channels of the mouthpieces may be configured such that the airflow channel of the first mouthpiece cools air flowing through the airflow channel of the first mouthpiece stronger than air flowing through the airflow channel of the second mouthpiece.

These different mouthpieces may be utilized to facilitate different smoking experiences. The first mouthpiece cooling air flowing through the airflow channel stronger than the second mouthpiece cooling air flowing through the airflow channel of the second mouthpiece may lead to different aerosol generation. In this regard, aerosol is generated by formation of liquid droplets in air drawn from outside of the system through or next to the heating chamber and further towards the airflow channel of the mouthpiece. Volatilized aerosol-forming substrate is entrained by the airflow. The volatilized aerosol-forming substrate forms the liquid droplets predominantly during cooling of the airflow. Hence, stronger cooling of the first mouthpiece may result in the formation of more or larger droplets. In this way, stronger or denser aerosol may be generated. If a user desires a lighter smoking experience, the user may attach the second mouthpiece to the aerosol-generating device, which cools the air flowing through the airflow channel less strong. Consequently, a lighter or less dense aerosol may be generated for inhalation by the user.

The invention also relates to a system comprising an aerosol-generating device as described above and a mouthpiece as described above or a set of mouthpieces as described above.

The system may comprise an aerosol-generating article comprising an aerosol-forming substrate, the aerosol-generating article for use with the aerosol-generating device and the mouthpiece or set of mouthpieces.

The invention also relates to a method for controlling an operation parameter of an aerosol-generating device, wherein the method comprises:
  i. detecting a type of mouthpiece received by an aerosol-generating device; and
  ii. controlling an operation parameter of the aerosol-generating device on basis of the detected type of mouthpiece received by the aerosol-generating device.

The method may comprise the step of providing an aerosol-generating device as described above.

The method may comprise the step of providing a mouthpiece as described above.

The method may comprise the step of engaging the mouthpiece with the aerosol-generating device.

The method may comprise the steps of:
  providing to an input, a signal indicative of a type of mouthpiece engaged with the aerosol-generating device;
  determining a type of mouthpiece engaged with the aerosol-generating device on the basis of said signal;
  providing an output to control said operation parameter of the aerosol-generating device.

The method may comprise the step of controlling one or more of: a maximum operating temperature for the heating element, the temperature of the heating element over time, the resistance of the heating element, the resistance of the heating element over time, the power supplied to the heating element, the power supplied to the heating element over time, a maximum heating time per puff, a minimum time between puffs, a maximum number of puffs per aerosol-generating article, a rate of air flow through the device, a duration of time of a preheating period, a target temperature for a preheating period, a temperature change over time during a preheating period, a temperature change over time during a usage session of the aerosol-generating device, one or more target temperatures during a usage session, a duration of time of a usage session and a maximum total heating time for the aerosol-generating article.

The method may comprise the step of selecting a predefined temperature profile.

The method may comprise the step of selecting a predefined temperature profile from a look up table stored in a memory of the aerosol-generating device.

The invention also relates to a non-transitory computer readable medium comprising software for causing a controller as described above to execute the method as described above. The invention also relates to a non-transitory computer readable medium comprising software for causing an aerosol-generating device as described above to execute the method as described above. The invention also relates to a non-transitory computer readable medium comprising software for causing an aerosol-generating system as described above to execute the method as described above.

The invention also relates to a controller for controlling operation of an aerosol-generating device as above described, the controller comprising:
  input means for receiving an input signal indicative of a type of mouthpiece engaged with the aerosol-generating device;
  processing means for determining a type of mouthpiece engaged with the aerosol-generating device on the basis of said input signal,
  wherein said processing means is configured to determine a desired operation parameter of the aerosol-generating device on the basis of said determined type of mouthpiece engaged with the aerosol-generating device;
  output means for providing an output signal to control said determined operation parameter.

The operation parameter may be substantially as above described with reference to the aerosol-generating device. Features described in relation to one aspect may equally be applied to other aspects of the invention.

The invention will be further described, by way of example only, with reference to the accompanying drawings in which.

Figure 1:
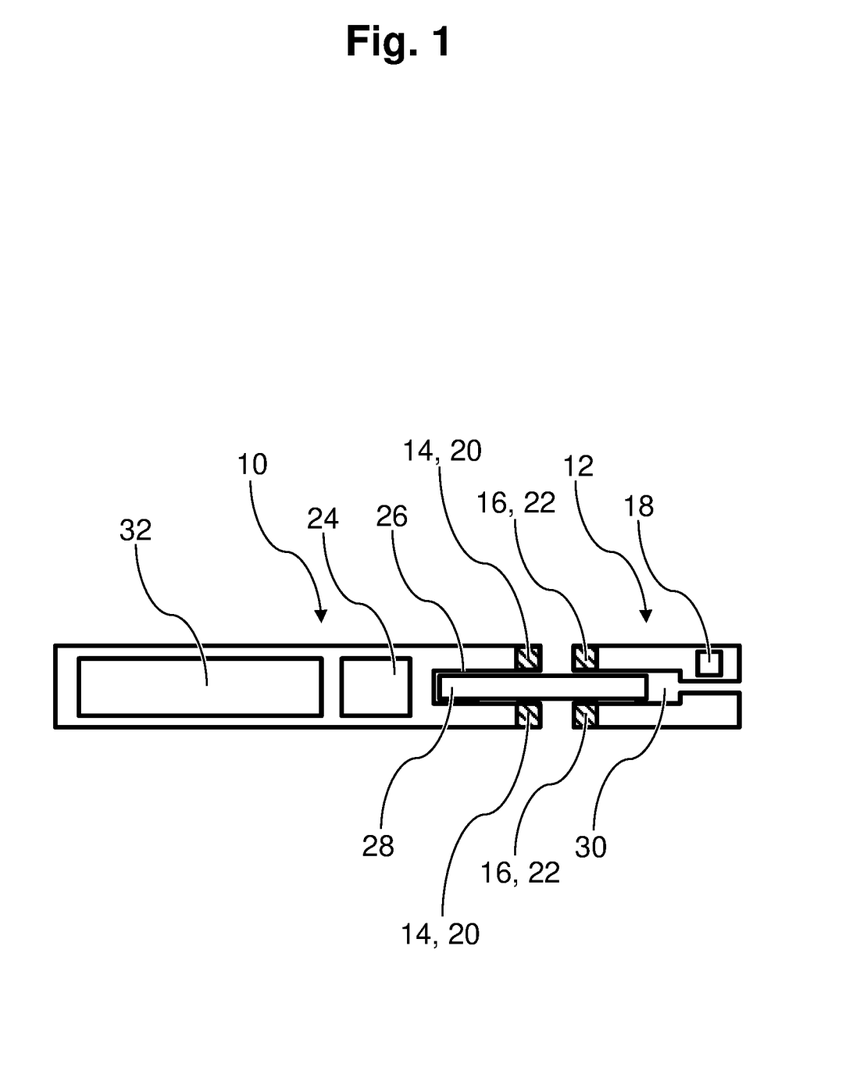
FIG. 1 shows a cross sectional view of an aerosol-generating device, an aerosol-generating article and a mouthpiece according to an embodiment of the invention.

FIG. 1 shows an aerosol-generating device 10 and a mouthpiece 12. The aerosol-generating device 10 comprises attachment means 14 for attaching the aerosol-generating device 10 to the mouthpiece 12. The mouthpiece 12 comprises corresponding attachment means 16 to facilitate attachment with the aerosol-generating device 10.

Multiple different types of mouthpieces 12 can be attached to the aerosol-generating device 10. The type of mouthpiece 12 is indicated by a tag 18. The tag 18 may for example by a color marking. A user may be able to identify the type of mouthpiece 12 by looking at or touching the tag 18.

The aerosol-generating device 10 comprises a detection element 20 configured for identifying the type of mouthpiece 12 attached to the aerosol-generating device 10. The mouthpiece 12 comprises a corresponding identification element 22 which enables the detection element 20 of the aerosol-generating device 10 to identify the type of mouthpiece 12 attached to the aerosol-generating device 10.

The different types of mouthpieces 12 are provided to enable selecting an operation parameter of the aerosol-generating device 10. The aerosol-generating device 10 comprises a controller 24 configured to control the operation parameter of the aerosol-generating device 10 on basis of the detected attached mouthpiece 12. The operation parameter may be the temperature profile of a heating element of the aerosol-generating device. The operation parameter of the aerosol-generating device 10 is preferably one or more parameters or properties relating to the specific operation of the heating element arranged in or around a heating chamber 26 of the aerosol-generating device 10. The operation of the heating element may include the maximum temperature reached by the heating element during operation. The operation of the heating element may include length of operation of the heating element. The operation of the heating element may include a preheating operation and length and temperature of a preheating operation of the heating element.

The heating element of the aerosol-generating device 10 is configured to heat an aerosol-generating article 28 for aerosol generation. The aerosol-generating article 28 may be inserted into the heating chamber 26 of the aerosol-generating device 10. The aerosol-generating article 28 may be sandwiched between the aerosol-generating device 10 and the mouthpiece 12. A user may draw on the mouthpiece 12 to inhale the generated aerosol. The attachment means 14, 16 of the aerosol-generating device 10 and the mouthpiece 12 may be configured to facilitate an air-tight connection between the aerosol-generating device 10 and the mouthpiece 12. The air-tight connection may force air to be drawn from an air inlet of the aerosol-generating device 10 through the heating chamber 26 and the aerosol-generating article 28 towards the mouthpiece 12. In other words, the air-tight connection between the mouthpiece 12 and the aerosol-generating device 10 may prevent airflow between the aerosol-generating device 10 and the mouthpiece 12 apart from the above described desired airflow through the aerosol-generating article 28.

The heating chamber 26 may be configured so that an aerosol-generating article 28 inserted into the heating chamber 26 is received in the heating chamber 26 in a snug fit manner. The mouthpiece 12 may comprise a cavity 30 for receiving a part of an aerosol-generating article 28. If the mouthpiece 12 and the aerosol-generating device 10 are attached to each other, an aerosol-generating article 28 may be partly inserted into the heating chamber 26 and partly received in the cavity 30 of the mouthpiece 12.

The heating element may be powered by a power supply 32 such as a battery. The power supply 32 may be arranged in the aerosol-generating device 10.

Figure 2:
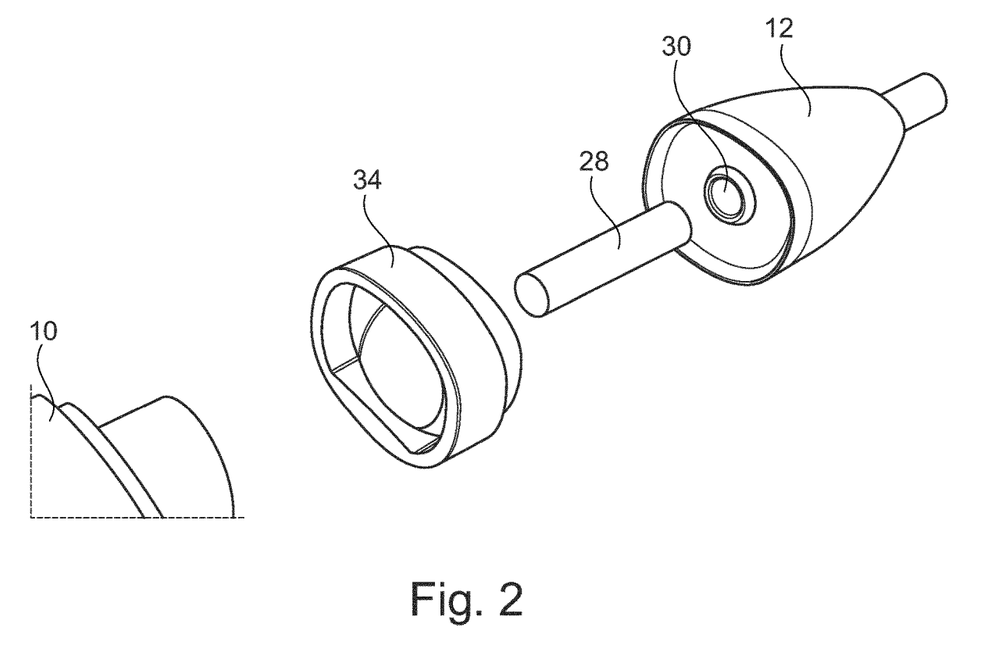
FIG. 2 shows a disassembled configuration of an aerosol-generating device, an aerosol-generating article, a mouthpiece and an intermediate element according to an embodiment of the invention.

FIG. 2 shows a detached configuration of the aerosol-generating device 10 and the mouthpiece 12. Additionally, FIG. 2 shows an intermediate element 34. The intermediate element 34 is preferably part of the mouthpiece 12 so that the mouthpiece is provided as a two-piece element. The intermediate element 34 may be used to control an operation parameter of the aerosol-generating device 10. In this regard, the intermediate element 34 may comprise an identification element 22 and a tag 18 as described above with respect to the mouthpiece 12. In this embodiment, a user may use a single aerosol-generating device 10 and a single mouthpiece 12 and adapt operation of the aerosol-generating device 10 by choosing the appropriate intermediate element 34. The intermediate element 34 may comprise connection means for attaching the intermediate element 34 to the aerosol-generating device 10 and to the mouthpiece 12. The intermediate element 34 may also be used for design customization by using different colours or haptic structures. The intermediate element 34 may be used to enhance gripping by providing a structured surface on the outer perimeter of the intermediate element 34.

Figure 3:
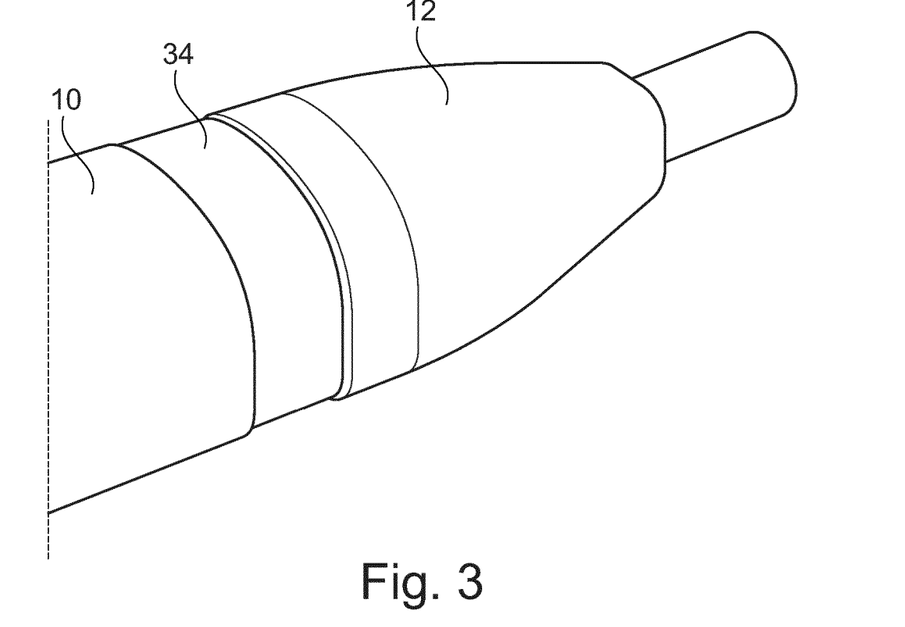
FIG. 3 shows an assembled configuration of the elements shown in FIG. 2.

FIG. 3 shows an assembled configuration of the elements shown in FIG. 2. As can be seen in FIG. 3, the aerosol-generating article 28 is enclosed by the mouthpiece 12, the aerosol-generating device 10 and the intermediate element 34. If no intermediate element 34 would be used, as shown in the embodiment of FIG. 1, the aerosol-generating device 10 and the mouthpiece 12 would be dimensioned to enclose the aerosol-generating article 28 after assembly.

Figure 4:
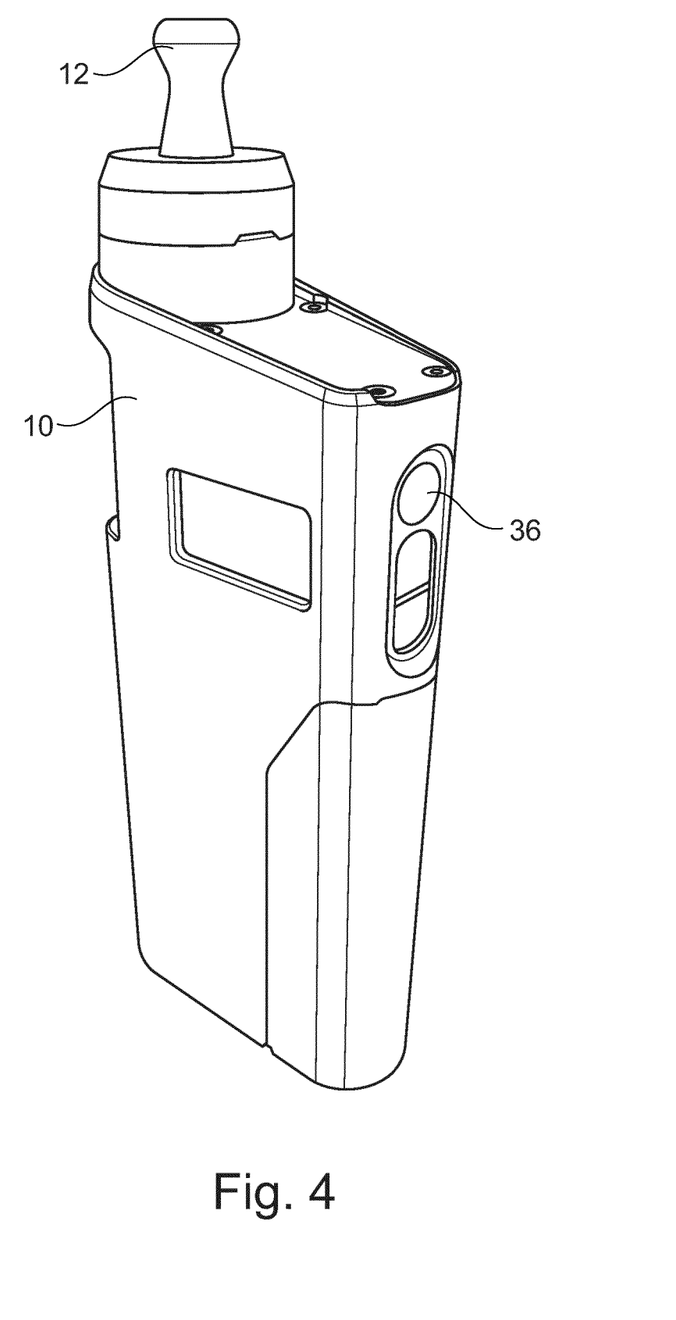
FIG. 4 shows a further embodiment of the invention with an aerosol-generating device and an attached mouthpiece.
Figure 5:
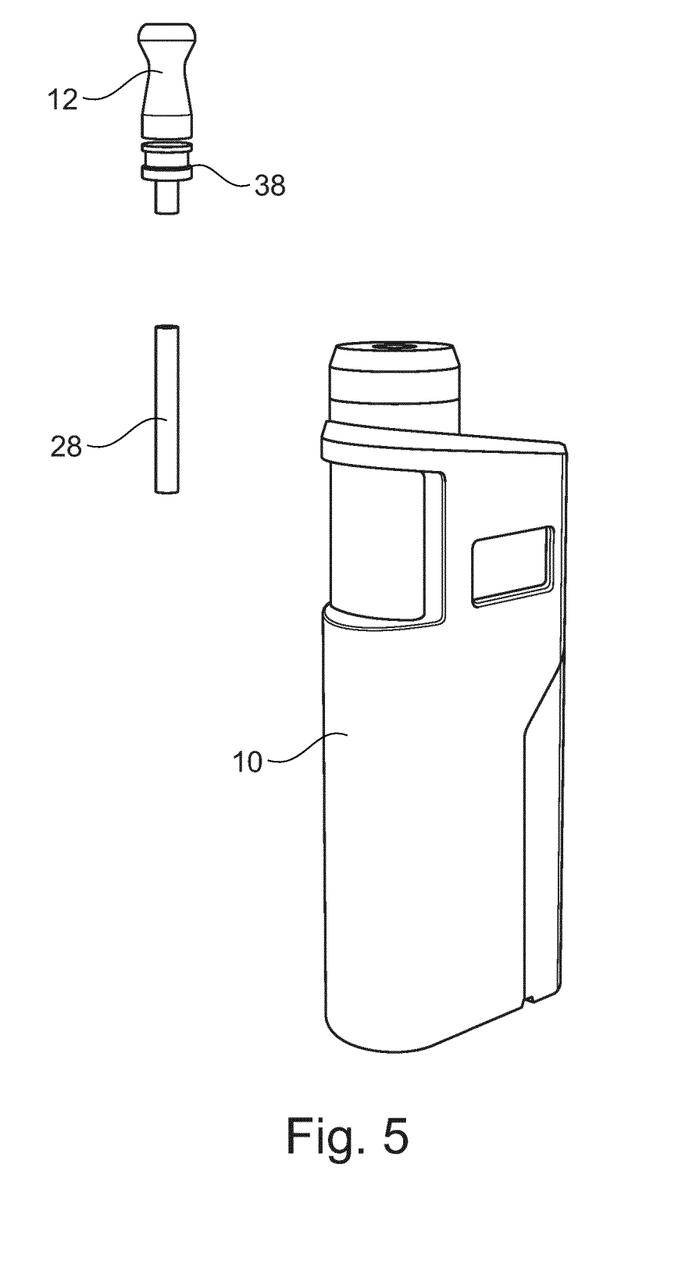
FIG. 5 shows a disassembled configuration of the elements shown in FIG. 4.

FIGS. 4 and 5 show a different embodiment, in which the mouthpiece 12 does not comprise a cavity 30 for partly receiving the aerosol-generating article 28. In this embodiment, the aerosol-generating article 28 is fully received in the heating chamber 26 of the aerosol-generating device 10, while the mouthpiece 12 only closes off the proximal end of the heating chamber 26. FIGS. 4 and 5 also show further potential elements such as one or more buttons 36 for controlling operation of the aerosol-generating device 10 and seals 38 for preventing unwanted airflow. In FIG. 4, the mouthpiece 12 is attached to the aerosol-generating device 10, while in FIG. 5, the mouthpiece 12 is detached from the aerosol-generating device 10.

The invention claimed is:

1. Aerosol-generating device for receiving a mouthpiece, the aerosol-generating device comprising:
   a detection element for detecting a type of mouthpiece received by the aerosol-generating device;
   a controller for controlling an operation parameter of the aerosol-generating device; and
   a heating element configured to heat an aerosol-forming substrate of an aerosol-generating article when the aerosol-generating article is received by the aerosol-generating device,
   wherein the controller is configured to receive an input indicative of the type of mouthpiece detected by the detection element,
   wherein the controller is configured to control the operation parameter of the aerosol-generating device on basis of the detected type of mouthpiece received by the aerosol-generating device, wherein the operation parameter of the aerosol-generating device comprises different temperature profiles of the heating element during heating.

2. Aerosol-generating device according to claim 1, wherein the detection element comprises one or more of an optical recognition element, a barcode reader, a RFID reader, a poka yoke, a conductor, a resistor or an inductor.

3. Aerosol-generating device according to claim 1, wherein said controlling of the operation parameter of the aerosol-generating device comprises selecting one or more properties of the temperature profile on the basis of the detected type of received mouthpiece.

4. Aerosol-generating device according to claim 3, wherein said one or more properties comprise any of:
   a duration of time of a preheating period;
   a target temperature for a preheating period;
   a temperature change over time during a preheating period;

a temperature change over time during a usage session of the aerosol-generating device;
one or more target temperatures during a usage session; and
a duration of time of a usage session.

5. Aerosol-generating device according to claim 1, wherein said controlling comprises selecting a predefined temperature profile from a look up table, on the basis of the detected type of mouthpiece received by the aerosol-generating device.

6. Non-transitory computer readable medium comprising software for causing the controller of an aerosol-generating device according to claim 1 to execute said controlling the operation parameter on the basis of the detected type of mouthpiece received by the aerosol-generating device.

7. Mouthpiece for an aerosol-generating device according to claim 1, wherein the mouthpiece is configured to be received by an aerosol-generating device, wherein the mouthpiece comprises an identification element indicative of the type of mouthpiece, and wherein the identification element is detectable by the aerosol-generating device, when the mouthpiece is received by the aerosol-generating device.

8. Mouthpiece according to claim 7, wherein said identification element comprises any of:
a barcode;
a pattern;
an RFID tag;
a poka yoke;
a taggant;
a conductive patch;
a resistivity value;
an area of differing resistance relative to the rest of the mouthpiece;
a capacitance,
an inductive element; and
a susceptor material.

9. Mouthpiece according to claim 7, wherein each mouthpiece comprises a tag configured to enable a user to identify the type of mouthpiece.

10. Set of mouthpieces, wherein the set of mouthpieces comprises at least a first mouthpiece and a second mouthpiece, according to claim 7.

11. Set of mouthpieces according to claim 10, wherein each mouthpiece comprises an airflow channel, wherein the airflow channels of the mouthpieces are configured to cool air flowing through the airflow channels, wherein the airflow channels of the mouthpieces are configured such that the airflow channel of the first mouthpiece cools air flowing through the airflow channel of the first mouthpiece stronger than air flowing through the airflow channel of the second mouthpiece.

12. System comprising an aerosol-generating device for receiving a mouthpiece, the aerosol-generating device comprising:
a detection element for detecting a type of mouthpiece received by the aerosol-generating device;
a controller for controlling an operation parameter of the aerosol-generating device; and
a heating element configured to heat an aerosol-forming substrate of an aerosol-generating article when the aerosol-generating article is received by the aerosol-generating device,
wherein the controller is configured to receive an input indicative of the type of mouthpiece detected by the detection element,
wherein the controller is configured to control the operation parameter of the aerosol-generating device on basis of the detected type of mouthpiece received by the aerosol-generating device, wherein the operation parameter of the aerosol-generating device comprises a temperature profile of the heating element during heating, and
a mouthpiece or a set of mouthpieces, according to claim 10.

13. Method for controlling an operation parameter of an aerosol-generating device, the aerosol-generating device comprising a heating element configured to heat an aerosol-forming substrate of an aerosol-generating article when the aerosol-generating article is received by the aerosol-generating device, wherein the method comprises:
i. detecting a type of mouthpiece received by an aerosol-generating device; and
ii. controlling an operation parameter of the aerosol-generating device on basis of the detected type of mouthpiece received by the aerosol-generating device, wherein the operation parameter of the aerosol-generating device comprises different temperature profiles of the heating element during heating.

14. Non-transitory computer readable medium comprising software for causing a controller to execute the method according to claim 13.

* * * * *